United States Patent [19]
Suganuma et al.

[11] Patent Number: 6,029,512
[45] Date of Patent: Feb. 29, 2000

[54] SLIP-DETECTING DEVICE FOR A DRIVING BELT OF A GENERATOR

[75] Inventors: Hideaki Suganuma; Masahiko Hibino, both of Susono, Japan

[73] Assignee: Toyota Jidosha Kabushiki Kaisha, Aichi-ken, Japan

[21] Appl. No.: 08/927,933

[22] Filed: Sep. 11, 1997

[30] Foreign Application Priority Data

Sep. 18, 1996 [JP] Japan .................................. 8-246266

[51] Int. Cl.[7] ................................................ G01M 15/00
[52] U.S. Cl. ...................... 73/118.1; 322/29; 340/428; 340/455
[58] Field of Search .................................. 73/116, 117.3, 73/118.1, 507; 320/123; 322/29, 43, 99; 340/428, 455

[56] References Cited

U.S. PATENT DOCUMENTS

| | | |
|---|---|---|
| 3,877,003 | 4/1975 | Kawashima et al. . |
| 4,084,126 | 4/1978 | Clements . |
| 4,263,578 | 4/1981 | Fukuhara et al. ..................... 340/52 R |
| 4,697,091 | 9/1987 | Tamura ..................... 73/507 |
| 4,701,852 | 10/1987 | Ulveland ..................... 340/52 F |
| 4,877,118 | 10/1989 | Tamura ..................... 192/150 |
| 5,115,183 | 5/1992 | Kyoukane et al. ..................... 322/29 |
| 5,144,220 | 9/1992 | Iwatani et al. ..................... 322/28 |
| 5,672,954 | 9/1997 | Watanabe ..................... 322/22 |

OTHER PUBLICATIONS

SAE 941042, Development of an Alternator–Powered Electrically–Heated Catalyst System:, Paul M. Laing. May 24, 1994.

SAE 960342, Study on Conformity Technology with ULEV Using EHC System:, Yuichi Shimasaki, et al. 1996.

*Primary Examiner*—Eric S. McCall
*Attorney, Agent, or Firm*—Kenyon & Kenyon

[57] ABSTRACT

An electrically heated catalytic converter (EHC) and a battery are connected to an alternator via a changeover switch. The changeover switch connects either of the EHC and the battery to the alternator. The slip-detecting device detects the rotational speed of the alternator from the frequency of the ripple in the output voltage of the alternator when the EHC is connected to the alternator, i.e., when the battery is isolated from the alternator. When the battery is isolated from the alternator, the output voltage of the alternator is raised, and the amplitude of the ripple becomes large accordingly. Further, since the battery is isolated, the ripples in the output voltage are not smoothed by the battery. Therefore, the rotational speed of the alternator is accurately detected. The slip-detecting device detects the slip of the driving belt of the generator based on the rotational speeds of the driver and the alternator.

7 Claims, 4 Drawing Sheets

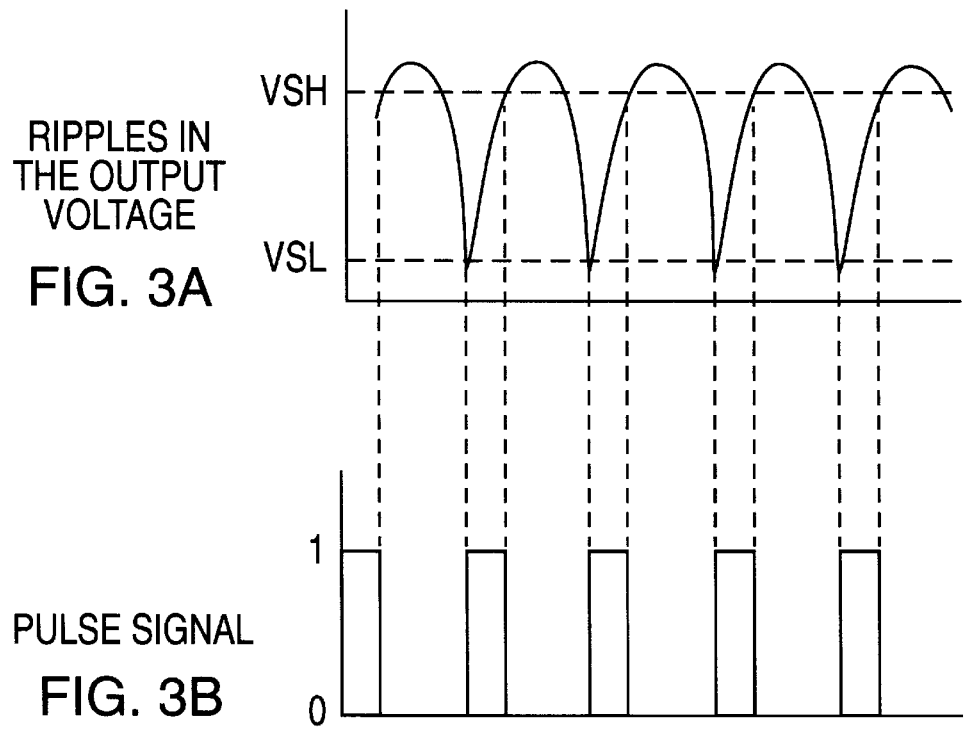
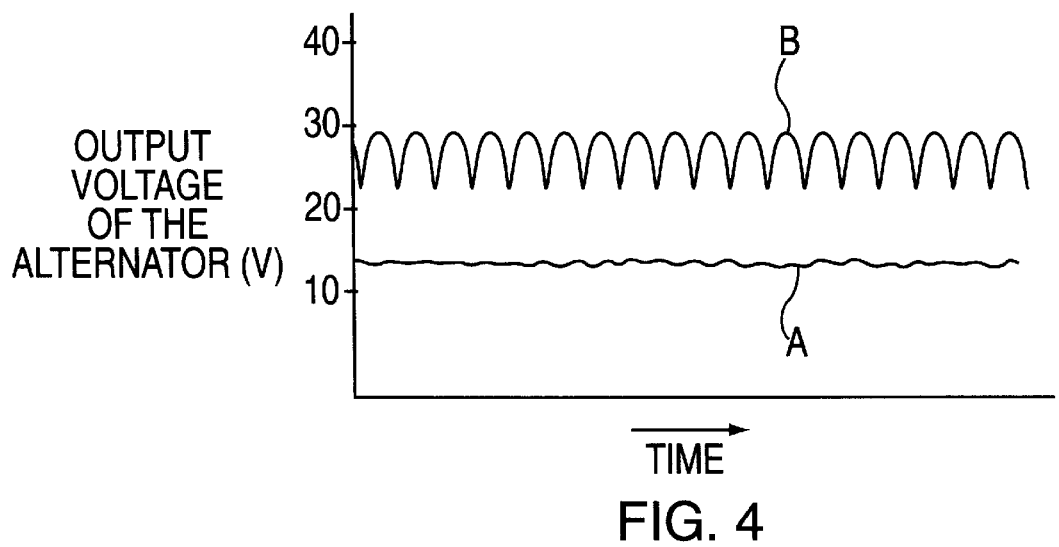

SLIP-DETECTING DEVICE FOR A DRIVING BELT OF A GENERATOR

BACKGROUND OF THE INVENTION

1. Field of the Invention

The present invention relates to a slip-detecting device which is capable of detecting a slip of a driving belt of a generator.

2. Description of the Related Art

When a generator is driven by a driver, such as an internal combustion engine, via a driving belt, such as V-belt, it is important to correctly detect a slip of the driving belt.

In general, when the slip of the driving belt occurs, since a driving power of the driver is not adequately transferred to the generator, the output power of the generator decreases. In a generator used for a vehicle, this slip of the driving belt sometimes causes improper charging and results in damage to the battery. Therefore, it is necessary to detect the slip of the driving belt in order to prevent damage to the battery. Further, it is known that the remaining service life of the driving belt has a relationship to the amount of the slip of the belt. Namely, it is known that the amount of slip becomes larger as the remaining service life of the driving belt becomes shorter. Therefore, it is also required to detect the slip of the driving belt correctly in order to predict the remaining service life of the belt and to prevent the trouble caused by breakage of the belt.

Heretofore, various devices have been proposed to detect the slip of driving belt of the generator. For example, Japanese Unexamined Patent Publication (Kokai) No. 49-46054 discloses a slip-detecting device for a driving belt of a generator which is provided with a main detector for detecting a rotational speed of an internal combustion engine and a sub detector for detecting a rotational speed of a generator driven by the engine via a driving belt. The device in '054 publication detects the slip of the driving belt based on an accumulated values of the speed signals from the main detector and the sub detector.

In general, the slip of the driving belt can be easily detected by detecting and comparing the rotational speeds of the driver (the engine) and the driven equipment (the generator). Further, an internal combustion engine is usually provided with an engine speed detector (for example, a crank angle detector) in order to utilize an engine speed as a control parameter of the engine. Therefore, if an internal combustion engine is used as the driver, an accurate engine speed is easily detected.

However, usually, a generator is not provided with a speed detector. Especially, in case of a vehicle engine, since it involves additional cost, it is not preferable to provide a speed detector on the generator which is used exclusively for detecting the generator speed. Therefore, a fluctuation of an output voltage of the generator or a waveform thereof, in lieu of the speed detector, is normally used for calculating the generator speed. The sub detector in the device of the '054 publication generates a pulse signal having frequency proportional to the generator rotational speed by processing the fluctuations (the ripples) of the output voltage by a waveform shaping circuit. Namely, in the '054 publication, the generator speed is detected based on the fluctuations (the ripples) of the output voltage of the generator.

However, if the generator speed is detected based on the ripples in the generator output, it is difficult to detect an accurate generator speed in some cases.

In some generator system, such as in the generator system of a vehicle, a battery is always connected to the generator in order to charge the battery during the operation of the engine. Therefore, in this type of the generator system, the output voltage of the generator is usually controlled so that the output voltage becomes lower than an upper limit (for example, 12 to 14 volts) in order to prevent overcharging of the battery by keeping the electric current supplied to the battery at an adequate level. In this case, since the output voltage of the generator is controlled in a relatively small range, accordingly, the amplitude of the ripples becomes small. Further, since the battery is always connected to the generator, the ripples in the output voltage are smoothed by the battery and, thereby, the amplitude of the ripples in the actual output voltage become very small.

Therefore, in the device of the '054 publication, a pulse signal accurately corresponding to the rotational speed of the generator is not obtained by waveform shaping due to the small amplitude of the ripples. Thus the generator speed calculated from the pulse signal is sometimes inaccurate in the device of the '054 publication and, thereby, the slip of the belt is not detected correctly in some cases.

SUMMARY OF THE INVENTION

In view of the problems in the related art as set forth above, the object of the present invention is to provide a slip-detecting device for a driving belt of a generator which is capable of detecting the slip of the driving belt correctly, using a simple method and without requiring a speed detector exclusively for detecting the generator speed.

This object is achieved by a slip-detecting device for a driving belt of a generator wherein the generator is driven by a driver via a driving belt and electrically connected to a battery and electric loads. The device comprises, driver speed detecting means for detecting a rotational speed of the driver of the generator, isolating means for isolating the battery from the generator and, simultaneously, raising an output voltage of the generator, generator speed detecting means for detecting the rotational speed of the generator based on the fluctuations of the output voltage thereof when the battery is isolated and the output voltage is raised by the isolating means and slip detecting means for detecting a slip of the driving belt based on the detected rotational speeds of the driver and the generator.

In the present invention, the generator is used for charging the battery and, further, the generator supplies electricity to electric loads (for example, in the case of a vehicle generator system, an electric heater of a defroster/defogger or an electrically heated catalytic converter). The rotational speed (i.e., the revolutions per min.) of the generator is detected based on the fluctuations of the output voltage of the generator in this invention. However, the detection of the generator speed is performed in the condition where the battery is isolated from the generator and the generator output voltage is raised to a value higher than the output voltage when the battery is connected to the generator. In this condition, the amplitude of the fluctuations (the ripples) in the generator output voltage increases in response to the increase of the output voltage and, since the battery is isolated from the generator, the ripples in the output voltage is not smoothed by the battery. Therefore, the ripples in the output voltage become distinct and can be accurately detected and, thereby, the generator rotational speed is accurately detected from the ripples.

BRIEF DESCRIPTION OF THE DRAWINGS

The present invention will be better understood from the description as set forth hereinafter, with reference to the accompanying drawings in which:

FIG. 3 shows timing diagrams explaining the waveform of the input and output signals of the waveform shaping circuit in FIG. 2;

FIG. 4 is a diagram showing the ripples in the generator output voltage; and

DESCRIPTION OF THE PREFERRED EMBODIMENT

Hereinafter, an embodiment of the present invention will be explained in detail with reference to the accompanying drawings.

Figure 1:
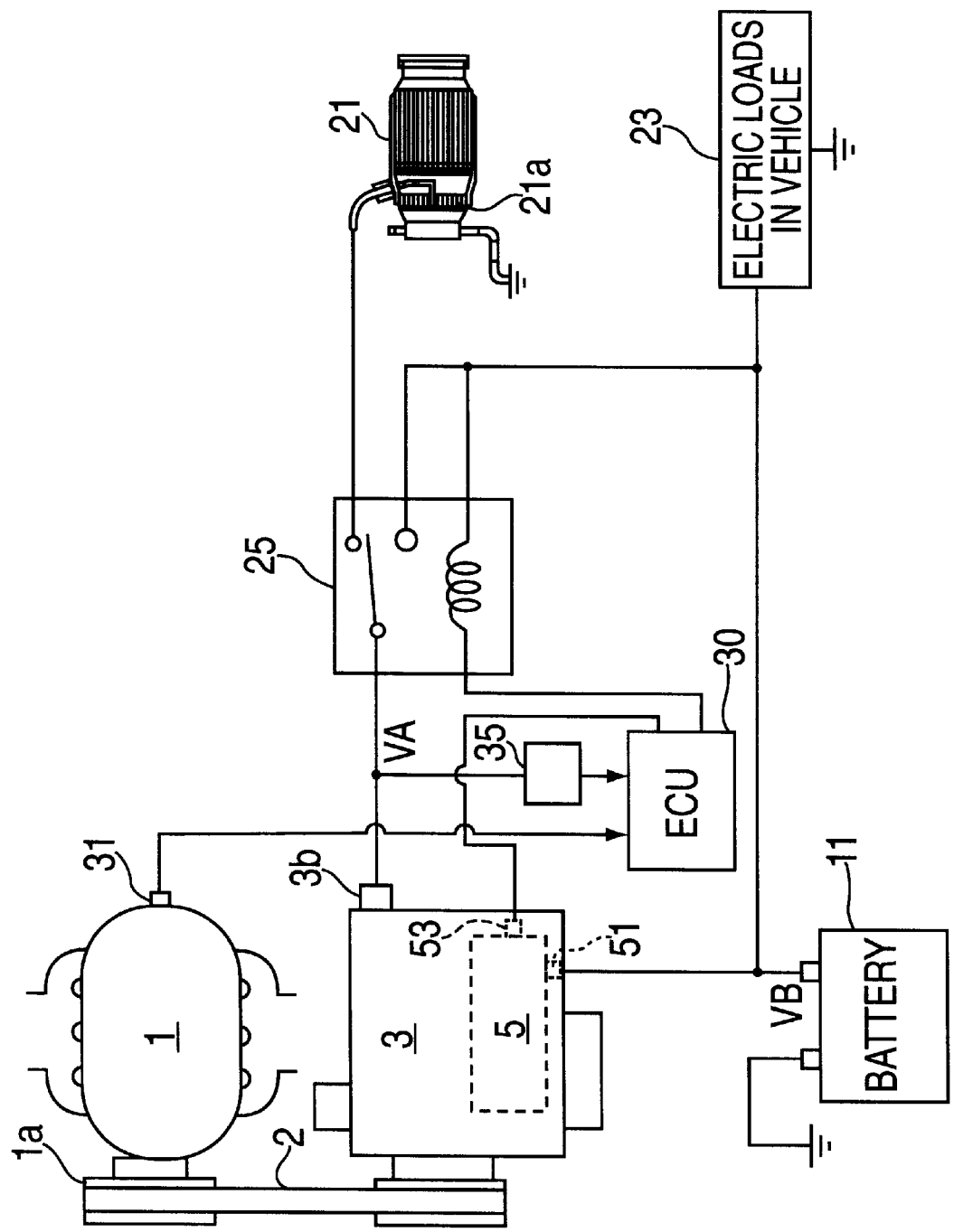
FIG. 1 schematically illustrates the general configuration of an embodiment of the present invention when it is applied to a vehicle engine.

FIG. 1 shows an embodiment of the present invention when it is applied to a vehicle generator system.

In FIG. 1, reference numeral 1 designates a vehicle engine, 3 designates a three-phase AC generator (an alternator). Numeral 1a in FIG. 1 indicates a driving pulley attached to an output shaft of the engine 1, numeral 2 is a pulley attached to a drive shaft of the rotor of the alternator 3 and, 2 is a generator driving belt connecting the engine 1 and the alternator 3. Namely, the alternator 3 is driven by the engine 1 via the driving belt 2.

In this embodiment, a diode rectifier (not shown in the drawing) is incorporated in the alternator 3, and the three-phase AC output of the stator of the alternator 3 is converted to a DC output, and the DC current is supplied from the output terminal 3b of the alternator 3. Further, the alternator 3 is provided with a regulator 5 which controls the exciting current of the coil rotor of the alternator 3. The function of the regulator 5 is explained later.

In FIG. 1, numeral 11 represents a battery and 21 represents an electrically heated catalytic converter (hereinafter referred to as "an EHC"). The EHC 21 in this embodiment includes a metal substrate 21a to which a catalyst is attached. When the temperature of the substrate 21a (i.e., the temperature of the catalyst) is low such as in the starting period of the engine, electricity is supplied to the substrate 21a in order to heat the catalyst in this embodiment. When an electric current flows through the metal substrate 21a, joule heat is generated in the substrate 21a and the substrate 21a and the catalyst attached thereon are heated to an activating temperature of the catalyst in a short time. Namely, the EHC 21 uses the substrate 21a of the catalyst as an electric heater for raising the temperature of the catalyst in a short time after the engine has started. Therefore, the EHC 21 in this embodiment starts the catalytic action for purifying the exhaust gas a short time after the engine has started.

The EHC 21 and the battery 11 are connected to the output terminal 3b of the alternator 3 via a changeover switch 25, whereby either of the EHC 21 and the battery can be selectively connected to the alternator 3 by switching the changeover switch 25.

Numeral 23 in FIG. 1 designates electric loads of the vehicle such as an ignition circuit and lamps on the vehicle. In this embodiment, the electric loads 23 are connected to the battery 11, and electric current is supplied to the electric loads 23 only from the battery 11 when the changeover switch 25 is set to the position where the EHC 21 is connected to the alternator 3.

In FIG. 1, numeral 30 represents an electronic control unit (ECU) for controlling the engine 1. In this embodiment, the ECU 30 may be constructed by a microcomputer, and comprises a central processing unit (CPU), a read-only-memory (ROM), a random-access-memory (RAM) and an input/output interface, all mutually connected by a bi-directional bus. The ECU 30 performs basic control such as the fuel injection control and the ignition control of the engine and, in this embodiment, the ECU 30 also acts as various means in the claims such as the driver speed detecting means, the isolating means, the generator speed detecting means and the slip detecting means.

To perform such functions, a crank angle pulse signal generated at predetermined rotation angles of the crankshaft (for example, every 15 degree) is supplied to the input/output interface of the ECU 30 from an engine speed sensor 31 disposed at the crankshaft of the engine 1. Further, the alternator output voltage VA is fed to the input/output interface of the ECU 30 from the output terminal 3b of the alternator 3 via a waveform shaping circuit 35. As explained later, the waveform shaping circuit 35 extracts the fluctuation component (the ripple component) from the output voltage VA and converts it to a pulse signal.

ECU 30 calculates the rotational speed of the engine 1, based on the frequency of the crank angle pulse signal fed from the engine speed sensor 31, by an engine speed calculation routine (not shown) performed at predetermined intervals. Further, the input/output interface of the ECU 30 is connected to the changeover switch 25 to perform the changeover operation of the switch 25.

Next, the function of the regulator 5 is explained. The regulator 5 includes a switching transistor which is connected to the rotor coil of the alternator 3 and controls the exciting current flowing through the coil by the ON/OFF operation of the transistor. In this embodiment, in the condition where the battery 11 is connected to the generator, the regulator 5 turns off the switching transistor to stop the supply of the exciting current to the rotor coil when the battery voltage becomes higher than a predetermined value (for example, 14 V), and turns on the switching transistor to supply the exciting current to the rotor coil when the battery voltage becomes lower than the predetermined value. Therefore, during the normal operation (i.e., when the changeover switch 25 is set to the position where the battery 11 is connected to the alternator), a constant voltage control in which the battery voltage is controlled at the value lower than the predetermined value is performed in order to prevent overcharging of the battery. For this constant voltage control, the battery terminal voltage VB is fed to an input terminal 51 of the regulator 5.

Another input terminal 53 of the regulator 5 is connected to the input/output interface of the ECU 30 to receive a changeover signal from the ECU 30. When the changeover signal is not fed to the input terminal 53, the regulator 5 performs the above-explained constant voltage control of the alternator 3 based on the battery terminal voltage VB. When the changeover signal from the ECU 30 is fed to the input terminal 53, the regulator 5 stops the above-explained constant voltage control of the alternator 3 by holding the switching transistor ON, whereby the maximum exciting current is supplied to the rotor coil and the output voltage of the alternator 3 largely increases.

In summary, the ECU 30 holds the changeover switch 25 at the position where the alternator 3 is connected to the battery 11 and stops the supply of the changeover signal to the regulator 5 during the normal operation. Therefore, the output voltage of the alternator 3 is controlled at a relatively low value which is lower than a predetermined value (for example, 14 V) when the battery 11 is connected to the alternator 3. On the other hand, when supplying electricity to the EHC 21 (for example, when the engine starts), the ECU 30 switches the position of the changeover switch 25 to the position where the output terminal 3b of the alternator 3 is connected to the EHC 21 and, simultaneously, supplies the changeover signal to the regulator 5. Therefore, the output voltage of the alternator 3 is largely increased in order to supply a large electric power to the EHC 21. In this embodiment, the output voltage of the alternator 3 when the changeover signal is supplied to the regulator 5 is set at about 25 V.

Next, the detection of the generator speed of the present embodiment is explained. As explained before, the three-phase AC current generated by the stator coil of the alternator 3 is converted to a DC current by the diode rectifier. Therefore, the output voltage of the alternator 3 at the output terminal 3b contains fluctuation component (the ripple) having a frequency six times of the rotational speed of the alternator 3. Thus, if the frequency of the ripple in the output voltage is measured accurately, the rotational speed of the alternator 3 is calculated by dividing the ripple frequency by 6. In this embodiment, the waveform shaping circuit 35 extracts the ripple in the output voltage at the output terminal 3b and converts it to a pulse signal. The ECU 30 detects the generator rotational speed by measuring the frequency of the pulse signal fed from the waveform circuit 35.

Figure 2:
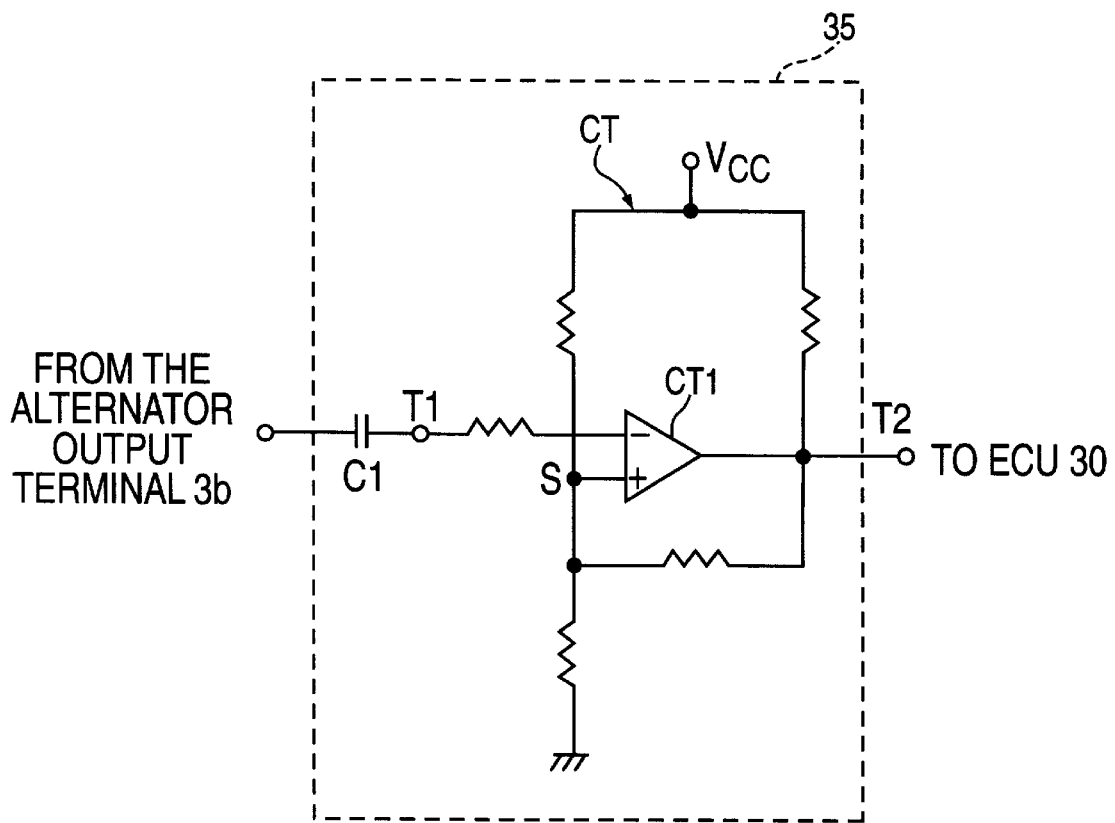
FIG. 2 shows an example of a circuit diagram of the waveform shaping circuit in FIG. 1.

FIG. 2 is a circuit diagram of the waveform shaping circuit 35. As shown in FIG. 2, the waveform shaping circuit 35 includes a coupling condenser C1 and inverting hysteresis comparator circuit CT. The coupling condenser C1 extracts the ripples in the output voltage of the terminal 3b and supplies only the ripples in the voltage to the comparator circuit CT. The voltage at the point S, i.e., the reference voltage VS of the comparator circuit CT changes according to whether the output of the comparator CT1 in the circuit CT is 1 or 0. The reference voltage VS becomes VSH (a high voltage) when the output of the comparator CT1 is 1 (a high level), and becomes VSL (a low voltage) when the output of the comparator CT1 is 0 (a low level).

FIG. 3 shows diagrams representing the waveform of the ripples in the voltage impressed from the condenser C1 to the terminal T1 of the comparator CT1 (the diagram (A) in FIG. 3) and the waveform of the pulse signal supplied from the terminal T2 of the comparator CT1 to the ECU 30 (the diagram (B) in FIG. 3). As seen from FIG. 3, the level of the output pulse signal (the diagram (B)) becomes low (0) when the input voltage at T1 becomes higher than the high reference voltage VSH, and becomes high (1) when the input voltage at T1 becomes lower than the low reference voltage VSL. Therefore, the pulse signal having a frequency the same as that of the ripples is supplied from the terminal T2 to the ECU 30.

As explained before, the frequency of the ripples in the output voltage at the output terminal 3b of the alternator 3 is exactly proportional to the rotational speed of the alternator 3. Therefore, the rotational speed of the alternator 3 can be accurately detected by measuring the frequency of the pulse signal. Consequently, the slip of the driving belt can be detected by comparing the rotational speed of the engine 1 detected by the engine speed sensor 31 and the rotational speed of the alternator 3 detected from the pulse signal.

In the comparator circuit of FIG. 2, however, the pulse signal exactly corresponding to the frequency of the ripples is not obtained when the amplitude of the ripples in the output voltage is small. When the amplitude of the ripples is small, it is necessary to narrow the interval between the high reference voltage VSH and the low reference voltage VSL to convert the ripples to the pulse signal, whereby the output pulse signal some times becomes inaccurate due to the influence of noise. Namely, the error in the detection of the ripple frequency becomes larger as the amplitude of the ripple becomes smaller. However, when the battery 11 is connected to the alternator 3, the output voltage of the alternator 3 must be controlled to a relatively low level (for example, lower than 14 V) to prevent overcharging of the battery 11. Since the amplitude of the ripple is proportional to the average output voltage, the amplitude of the ripple becomes small when the output voltage is controlled at a low level. In addition to that, since the fluctuation of the output voltage is smoothed by the battery 11, the amplitude of the ripple becomes very small when the battery 11 is connected to the alternator 3. Therefore, it is difficult to detect the exact frequency of the ripple (i.e., the rotational speed of the alternator 3) and, thereby, the slip of the driving belt cannot be correctly detected when the battery 11 is connected to the alternator 3.

This embodiment solves the problem by detecting the slip of the driving belt in the condition where the battery 11 is isolated from the alternator 3.

As explained before, when the EHC 21 is connected to the alternator 3 by the changeover switch 25, the battery 11 is isolated from the alternator 3. Further, in this condition, the regulator 5 raises the output voltage of the alternator 3 to a high level (for example, about 25 V). Therefore, the amplitude of the ripples becomes larger accordingly, and the ripples are not smoothed by the battery 11. Thus, the pulse signal exactly corresponding to the ripple frequency (i.e., the rotational speed of the alternator 3) is obtained by the waveform shaping circuit 35.

FIG. 4 is a diagram showing the waveforms of the output voltage of the alternator 3 when the battery 11 is connected to the alternator (the curve A in FIG. 4) and when the EHC 21 is connected to the alternator 3 (the curve B in FIG. 4). As seen from the curve A in FIG. 4, when the battery 11 is connected to the alternator 3, the output voltage of the alternator 3 fluctuates around about 14 V in a small amplitude, i.e. the amplitude of the ripple becomes very small. In contrast to this, as seen from the curve B in FIG. 4, the output voltage of the alternator 3 increases to about 25 V and, accordingly, the amplitude of the ripple increases largely (for example, increases to 7 V in the curve B) in the condition where the EHC 21 is connected to the alternator 3. Therefore, in this case, the interval between the high reference voltage VSH and the low reference voltage VSL can be set wide and, thereby, the pulse signal exactly corresponding to the ripple frequency can be obtained.

Figure 5:
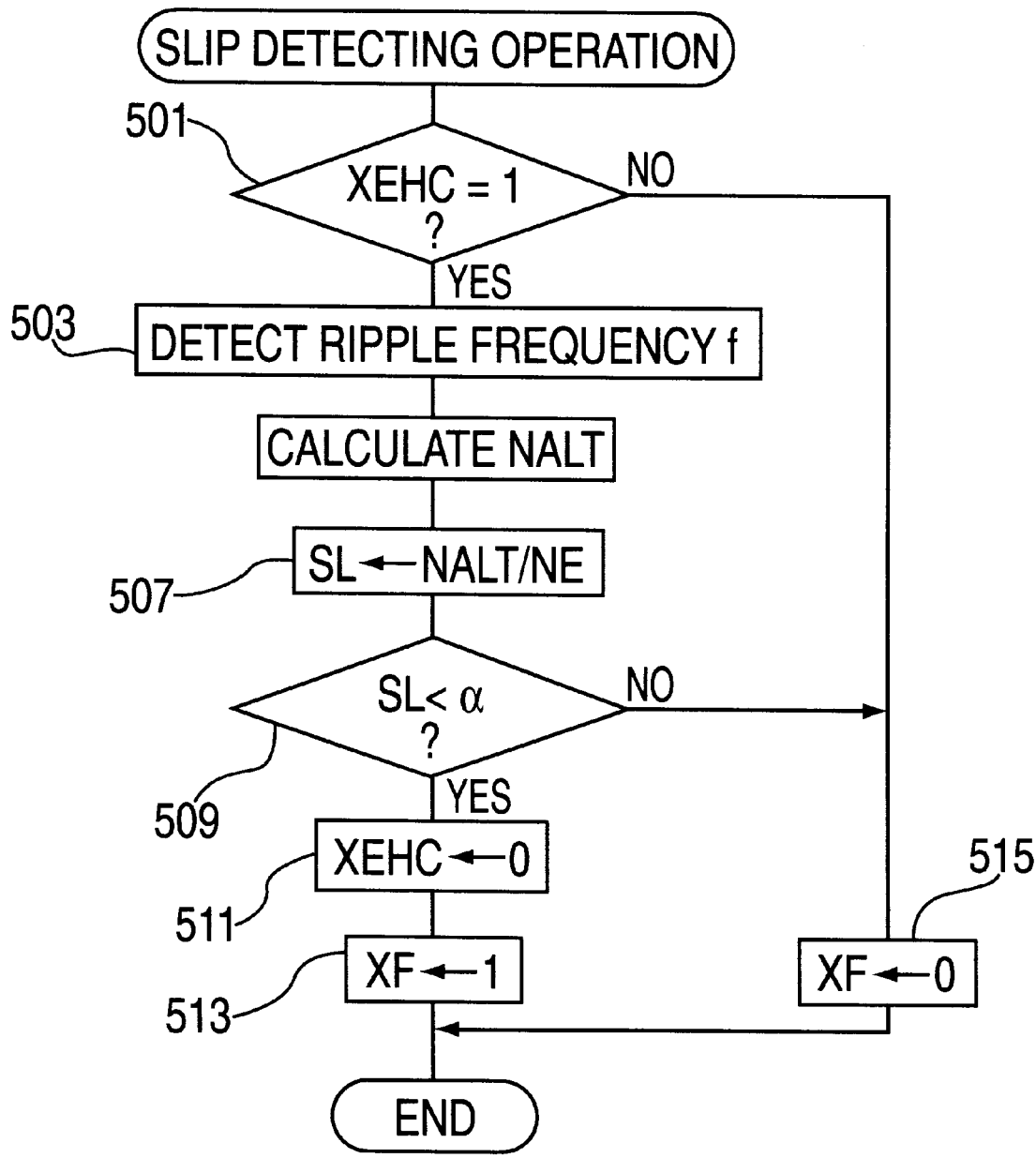
FIG. 5 is a flowchart explaining an example of the slip detecting operation according to the present invention.

FIG. 5 shows a flowchart of the detecting operation of the slip of the driving belt of the present embodiment. This operation is performed by a routine executed by the ECU 30 at predetermined intervals.

In FIG. 5, at step 501, the routine determines whether the value of a flag XEHC is set at 1. XEHC is a flag set by another routine (not shown) performed by the ECU 30 when it is required to supply electricity to the EHC 21 (for example, when the engine starts). In this embodiment, XEHC=1 means that electricity is being supplied to the EHC 21, and XEHC=0 means that electricity is not supplied to the EHC 21.

When the flag XEHC is set at 1, the ECU 30 sets the changeover switch 25 to the position connecting the EHC 21 to the output terminal 3b of the alternator 3 and, simultaneously, sends the changeover signal to the regulator 5 to raise the output voltage of the alternator 3. In contrast to this, when the flag XEHC is set at 0, the ECU 30 sets the changeover switch 25 to the position connecting the battery 11 to the alternator 3 and stops sending the changeover signal to the regulator 5 to control the output voltage of the alternator in accordance with the voltage of the battery terminal.

If XEHC=0 at step 501, since this means that the battery 11 is connected to the alternator 3, the routine terminates immediately without performing the detection of the slip of the driving belt. On the other hand, if XEHC=1 at step 501, since this means that the EHC 21 is connected to the alternator 3 and that the amplitude of the ripples in the output voltage of the alternator 3 is sufficiently large, the routine proceeds to step 503 to measure the frequency f of the pulse signal supplied from the waveform shaping circuit 35. Then the routine calculates the rotational speed NALT of the alternator 3 by NALT=f/6. Further, at step 507, a slip ratio SL of the driving belt is calculated by SL=NALT/NE. NE is the rotational speed of the engine 1 and calculated by a routine (not shown) performed by the ECU 30.

At step 509, the routine determines whether the calculated slip ratio SL is smaller than a predetermined value α. α is a constant smaller than 1.0, and set at, for example, 0.9 in this embodiment. If SL<α at step 509, this means that the slip of the belt is large and that a breakage of the belt may occur if the high electric power operation of the alternator is continued to supply a large electric power to the EHC 21. Therefore, in this case, the value of the flag XEHC is set at 0 at step 511 in order to terminate the supply of the electricity to the EHC 21. Further, at step 513, the routine sets the value of a failure flag XF to 1. When the value of the flag XF is set at 1, an alarm lamp visible to the driver of the vehicle is turned on by a routine separately performed by the ECU 20 to notify the slipping of the belt to the driver.

On the other hand, if SL>α at step 509, the value of the failure flag XF is set to 0 at step 515. The value of the failure flag XF may be stored in a backup RAM, if any, to prepare for inspection and maintenance in the future.

As explained above, the rotational speed of the alternator can be accurately detected by detecting the rotational speed of the alternator when the EHC 21 is connected to the alternator (i.e., when the battery 11 is isolated from the alternator).

In the above embodiment, though the EHC 21 is used as the electric loads requiring a large electric power, other large electric load such as a defogger or defroster for removing fog or frost from a windshield of the vehicle may be used in lieu of the EHC 21.

We claim:

1. A slip-detecting device for a driving belt of a generator, the generator being driven by a driver via the driving belt and being electrically connected to a battery and electric loads, the device comprising:

driver speed detecting means for detecting a rotational speed of the driver;

isolating means for isolating the battery from the generator and simultaneously raising an output voltage of the generator;

generator speed detecting means for detecting, when the battery is isolated from the generator and the output voltage is raised by the isolating means, a rotational speed of the generator based on fluctuation of the output voltage thereof; and slip detecting means for detecting a slip of the driving belt based on the detected driver rotational speed and the detected generator rotational speed.

2. A slip-detecting device as set forth in claim 1, wherein said isolating means isolates the battery and raises the output voltage of the generator when supplying electricity to a predetermined electric load.

3. A slip-detecting device as set forth in claim 2, wherein the predetermined electric load is a high power electric load requiring an amount of electric power greater than that required by at least one other electric load connected to the generator.

4. A slip-detecting device as set forth in claim 3 wherein said driver of the generator is an internal combustion engine.

5. A slip-detecting device as set forth in claim 4, wherein electricity is supplied to said predetermined electric load when the internal combustion engine is started.

6. A slip-detecting device as set forth in claim 4, wherein said predetermined electric load is an electric heater for heating a catalytic converter disposed in an exhaust gas passage of the internal combustion engine.

7. A slip-detecting device as set forth in claim 1, wherein said generator speed detecting means includes means for extracting a fluctuating component having a frequency proportional to the rotational speed of the generator from the fluctuations of the output voltage of the generator.

* * * * *